J. L. STRAUB.
BALL RETAINER.
APPLICATION FILED NOV. 22, 1911.

1,114,932.

Patented Oct. 27, 1914.

Witnesses
W. W. Nairn Jr.
R. V. Bishop

Inventor
Jackson L. Straub
By Julian C. Dowell
Attorney

UNITED STATES PATENT OFFICE.

JACKSON L. STRAUB, OF LANCASTER, PENNSYLVANIA, ASSIGNOR TO THE STAR BALL RETAINER COMPANY, OF LANCASTER, PENNSYLVANIA, A CORPORATION OF NEW JERSEY.

BALL-RETAINER.

1,114,932.  Specification of Letters Patent.  Patented Oct. 27, 1914.

Application filed November 22, 1911. Serial No. 661,792.

*To all whom it may concern:*

Be it known that I, JACKSON L. STRAUB, a citizen of the United States of America, residing at Lancaster, in the county of Lancaster and State of Pennsylvania, have invented certain new and useful Improvements in Ball-Retainers, of which the following is a specification.

This invention is a ball retainer for annular ball bearings and is designed more especially for bearings of the style known to the trade as "magneto type bearings" in which one of the race-rings is in the form of a cup or cone.

One object of the invention is to provide a retainer into which the balls may be easily inserted either before or after the retainer has been brought into operative relation to the inner race-ring and by which the inserted balls will be effectually held against accidental dislodgment while the frictional contact between the balls and the retainer will be reduced to a minimum.

Another object of the invention is to provide a retainer in which the balls will have some radial play to facilitate the assembling or disassembling of the inner race-ring, the retainer and the balls.

The invention will be hereinafter first fully described with reference to the accompanying drawings and the novel features of the invention will be particularly pointed out in the claims following the description.

Figure 1:
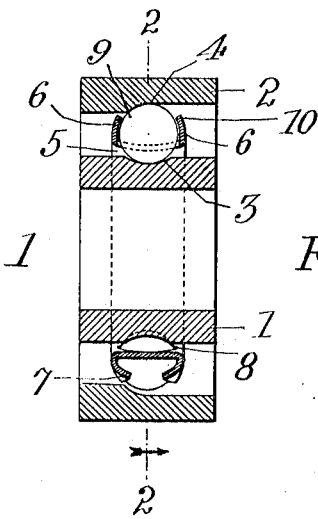
Figure 2:
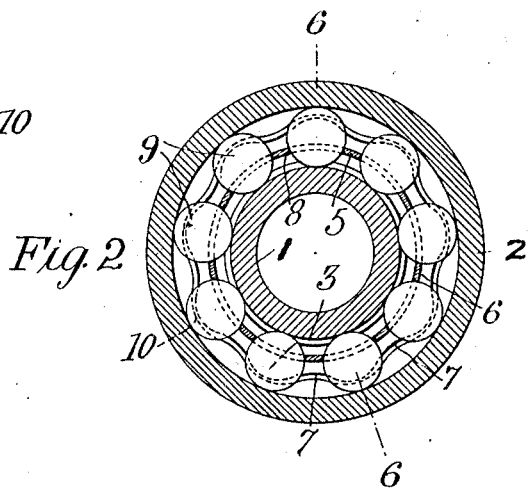
Figure 3:
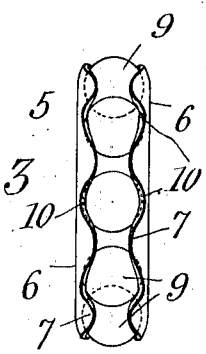
Figure 4:
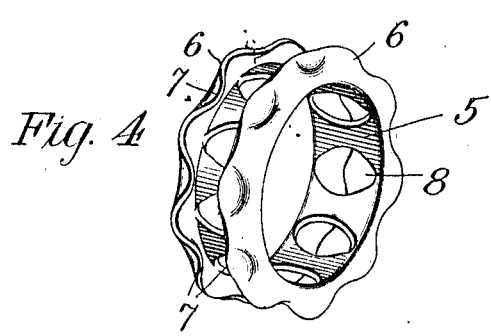
Figure 5:
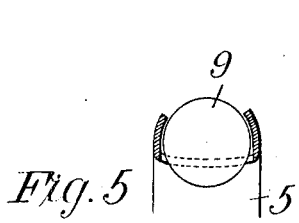
Figure 6:
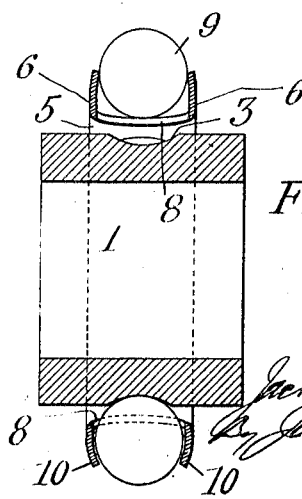

In the drawings, Figure 1 is a diametrical section of a ball bearing embodying the present improvements, Fig. 2 is a section taken on the line 2—2 of Fig. 1, Fig. 3 is a plan view of the retainer with balls therein and removed from the bearing, Fig. 4 is a perspective view of the retainer, Fig. 5 is an enlarged detail section showing a slightly modified form of the retainer, Fig. 6 is an enlarged diametrical section on the line 6—6 of Fig. 2, illustrating a method of assembling the retainer and balls upon the inner race-ring.

In the drawings, 1 denotes the inner and 2 the outer race-ring, the inner ring being provided with an annular groove or raceway 3 in its outer circumference. An annular raceway 4 is provided on the inner circumference of the outer ring, but this raceway is ordinarily flanked at only one side, the said outer ring being of cup form, as shown in Fig. 1, whereby it may be moved laterally into position around the assembled inner ring, retainer, and balls, as will be readily understood.

The retainer or cage consists of a substantially cylindrical annulus or base 5 having external marginal flanges or side plate 6, the free edges of the flanges being corrugated whereby they approach at intervals, as shown at 7, and the annulus having openings 8 formed therein. The said openings 8 are in alinement with the more widely separated portions of the flanges whereby balls 9 inserted between said portions will rest in the openings and project through the same to engage the raceway 3. The flanges or side plates may be given the desired form by merely crimping them at the points 7 and it will be readily understood that by forming these crimps in radial planes which alternate with the openings 8, pockets are provided to receive the balls and hold them in spaced relation while permitting them to engage the raceways in the bearing rings, the height of the flanges or side plates, of course, being less than the diameter of the balls so that the balls will project beyond both the inner and the outer circumferences of the retainer. The major axes of the openings 8 are perpendicular to the side plates or flanges and are greater than the diameter of the balls while the minor axes of the openings are less than the diameter of the balls, the result being that a ball will not engage the entire surface defining an opening but will merely rest upon diametrically opposite points thereof and frictional contact and wear between these parts will be reduced to a minimum. The width of the annulus or base being greater than the diameter of the balls, the flanges or side plates will be too far apart to bind the balls but the edges of the flanges are turned inwardly, as shown at 10, so that the greatest distance between them will be slightly less than the diameter of the balls and the balls cannot drop from the retainer. Moreover by this construction the balls will not bear constantly against extended portions of the flanges but will engage merely slight portions of the edges thereof. The frictional contact and wear between the balls and the flanges is consequently reduced to a minimum so that the balls may rotate freely and the bearing run easily and smoothly. The balls, being received in pockets as above described, will be effectually held apart so that they will not rub against each other.

The retainer or cage is preferably constructed of spring steel and the balls may, consequently, be entered between the flanges and inserted into the pockets of the retainer under slight pressure. In Fig. 6 I have illustrated a method of assembling in which the retainer or cage is first placed around the inner race-ring and the balls are then pressed between the flanges of the retainer into the openings 8 through which they will project to enter the raceway in the ring. When the full quota of balls has been inserted in the retainer, displacement of the balls and the retainer relative to the ring will be prevented by the walls or flanks of the raceway. The outer ring may then be brought into its proper position with respect to the inner ring by being pushed bodily endwise over the balls. It is not necessary, however, to place the retainer around the race-ring before inserting the balls. The balls may be inserted in the retainer and the assembled retainer and balls then pushed bodily over the ring, the balls moving radially of the retainer to clear the walls or flanks of the raceway. To facilitate this radial movement of the balls, the flanges of the retainer are preferably made of such height as to permit slight play of the balls which are consequently confined loosely in the retainer. Friction being thus reduced to a minimum, the life of the balls and of the retainer is prolonged, while the balls are effectually held by and within the retainer.

The flanges of the retainer may be equal or unequal in height as preferred, and in Fig. 5 I have shown the flange at one side shorter than the other. This form may sometimes be preferred as it conforms more closely to the cupped formation of the outer ring.

Having thus described my invention, what I claim as novel and desire to secure by Letters Patent is:

1. A ball retainer and separator for ball bearings consisting of a ring-shaped portion or base having spaced openings therein elliptical in form with their major axes extending transversely thereof, and integral radially extending flanges inclined toward each other and having their edges inturned at intervals so as to present opposed convex portions alternating with opposed concave portions coincident with said openings and separated a distance less than the diameter of a ball fitted therebetween, whereby pockets are formed for retaining balls protruding through said openings above and below said flanges.

2. A ball retainer and separator for ball bearings consisting of a ring-shaped portion or base having spaced elliptical openings therein to receive the balls, the minor axes of said openings being shorter than the diameter of a ball fitted therein, said base having integral radially extending flanges embracing the balls, and said flanges having their edges inturned at intervals so as to provide confronting concave portions between said inturned portions coincident with said openings, the distance between said concave portions being less than the diameter of a ball and increasing downwardly to the base of said flanges, whereby pockets are formed for retaining the balls in said openings with a minimum of contact points.

3. A ball retainer and separator consisting of a ring-shaped portion or base having spaced elliptical openings therein, the major axes of said openings extending transversely of the ring and their minor axes being shorter than the diameter of a ball to be retained, said base having integral radially extending marginal flanges, and said flanges having undulating edges providing confronting concave portions coincident with said openings, the distance between said concave portions being less than the diameter of a ball while the distance between the bases of said flanges is greater than the diameter of a ball, whereby pockets are formed for retaining balls between said concave portions and protruding above and below said flanges with points of contact at opposite sides of said openings and at the outer margins of said flanges only.

4. A radial thrust bearing comprising an annular ball retaining device having spaced elliptical openings therein and integral radially extending marginal flanges, and balls fitted between and protruding above and below said flanges, the major axes of said openings extending in the direction of the axis of the annulus and their minor axes being shorter than the diameter of a ball, the edges of said flanges being undulating in form and presenting concave confronting portions coincident with said openings embracing the balls, the latter adapted to contact with the outer margins only of the flanges and with the metal surrounding said openings at diametrically opposite points only.

In testimony whereof I affix my signature, in presence of two witnesses.

JACKSON L. STRAUB.

Witnesses:
W. A. Fuelmer,
A. G. Hertzler.